United States Patent
Robak

[15] 3,642,536
[45] Feb. 15, 1972

[54] CAPSTAN SCRAPER

[72] Inventor: Edward Robak, Garden Grove, Calif.
[73] Assignee: Technicolor, Inc., Hollywood, Calif.
[22] Filed: Jan. 7, 1970
[21] Appl. No.: 1,183

[52] U.S. Cl................................134/6, 15/256.51, 134/15, 134/33, 226/181
[51] Int. Cl........................................................B65h 27/00
[58] Field of Search..................15/100, 256.51, 93; 134/15, 134/6, 42, 32, 33, 122; 242/71.4, 71.5; 226/102, 200, 181–187; 352/130; 274/4 D, 11 F, 11 E

[56] References Cited

UNITED STATES PATENTS

| 914,729 | 3/1909 | Keller | 15/100 |
| 3,462,057 | 8/1969 | Yamamoto | 226/181 |

FOREIGN PATENTS OR APPLICATIONS

| 1,261,275 | 4/1961 | France | 226/183 |

Primary Examiner—Leon G. Machlin
Attorney—Lyon and Lyon

[57] ABSTRACT

There is disclosed herein a motion picture projector, such as a cartridge loaded projector, as a cartridge loaded projector, including a sound pickup assembly for picking up and reproducing sound recorded on the film. The sound pickup assembly includes a capstan for driving the film past a pickup transducer at an appropriate speed. A scraper assembly engages the capstan in such a manner that the edge of the scraper bears against the periphery of the capstan at all times. Not only does the scraper clean the capstan, but also the film is cleaned by the capstan.

5 Claims, 5 Drawing Figures

INVENTOR
EDWARD ROBAK
BY
Lyon & Lyon
ATTORNEYS

INVENTOR.
EDWARD ROBAK

CAPSTAN SCRAPER

This invention relates to motion picture projectors and the like, and more particularly to a capstan scraper engaging a film driving capstan for cleaning the film.

Various attempts have been made in cleaning motion picture film as it passes through a projection mechanism or the like. For example, U.S. Pat. No. 1,857,633 illustrates an arrangement wherein moving strips of cloth are employed for cleaning motion picture film as the same passes through a projector. Other apparatus, such as those disclosed in U.S. Pat. Nos. 1,716,878, 3,158,886 and 3,262,381, have been devised for cleaning motion picture film. However, devices of this nature generally are relatively bulky and costly.

Accordingly, it is a principal object of the present invention to provide a relatively simple device which aids in cleaning motion picture film.

Another object of this invention is to provide a novel capstan scraper which bears against a capstan which in turn drives motion picture film.

These and other objects and features of the present invention will become better understood through a consideration of the following description taken in conjunction with the drawings in which.

The movement of film through a projector carries with it particles or dirt of various kinds which contribute to film scratching or black opaque spots during projection. The moving film also is subjected to static charging which causes the adherance of loose dirt or particles, thereby producing objectionable projection viewing qualities. This condition can be further described and observed as an intermittent transfer of particles from a surface, such as a projector aperture plate, to the film and back to another projector surface. This may be clearly understood since a loose dirt particle may be attracted from a surface to the film because of the normal static charge buildup of the film caused during rubbing action of the film. In turn, as the particle continues to move and approaches another surface of opposite charge in the projector, the loose particle is attracted causing it to be removed from the film and transferred onto the passing surface.

The present invention uses the existence of the charge to transfer particles for removal and isolation from the system. The invention thus functions as a film, tape or strip cleaner.

As is described in more detail subsequently, the present concepts involve a roller or shaft, such as a capstan, along with a suitably mounted spring wiper or scraper grounded to the base of the mechanism. The scraper is mounted at an angle to provide a tip contact with the roller instead of tangential contact in order to maintain good particle removal and minimum material wear.

Figure 1:
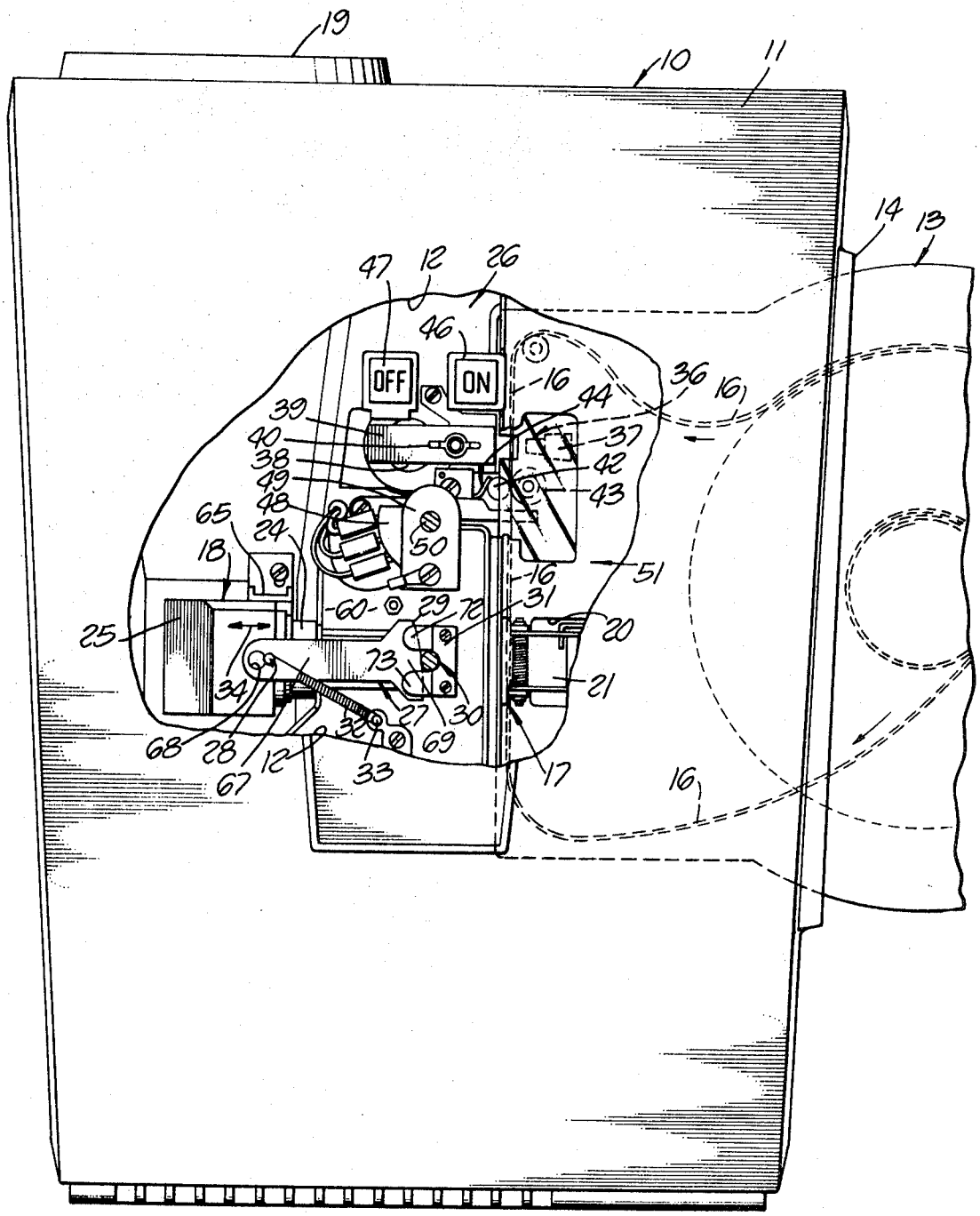
FIG. 1 is a plan view, partially broken away, of a motion picture projector employing the capstan scraper assembly of the present invention.

Turning now the the drawings, a projector 10 is illustrated in FIG. 1 and includes a housing 11 which is broken away at 12 in order to illustrate certain internal components of the projector. The projector illustrated may be of the nature of the Model 1,000 projector manufactured and sold by Technicolor, Inc. of Hollywood, California. The exemplary projector illustrated is a cartridge loaded projector including a cartridge 13 which is inserted within an aperture in the side 14 of the projector. The cartridge typically is of the construction illustrated in copending U.S. application Ser. No. 825,504, entitled "Motion Picture Film Cartridge," filed May 19, 1969 in the name of Edward Robak, now U.S. Pat. No. 3,568,943, issued Mar. 9, 1971, and assigned to the assignee of the present application, the disclosure of which is incorporated herein by reference.

The cartridge includes a plastic enclosure within which is disposed an endless loop of motion picture film having both picture frames and an optical sound track. A loop of film as designated by dashed lines 16 in FIG. 1 extends from the roll of film in the cartridge and passes through an aperture plate or film gate 17 for projection through a lens-prism assembly 18 out through an opening 19 at the front of the projector 10. A projection light source (not shown) is mounted within the projector and disposed beneath the cartridge. Light from the source is projected upwardly through an aperture 20 and reflected by a pivotal reflector assembly through the film and film gate 17 to the lens-prism assembly 18. The light is reflected toward the film by the underside surface of a reflector 21 of the reflector assembly. The film gate 17 includes two metal plates for appropriately guiding the film, and these plates have aligned apertures through which each frame of the film is projected. One of these plates is a stationary member and is affixed within the projector, and the other of these plates is spring loaded and comprises a part of the film cartridge 13 as more fully described in said copending application. This particular assembly comprises no part of the present invention.

The film is advanced through the projector by means of a reciprocating claw (not shown) which engages perforations within the film in a conventional manner. Each frame of the film is projected through the lenses of a lens barrel 24 to a prism assembly 25 which in turn serves to suitably reflect the images for projection out through the opening 19 at the front of the projector 10. The various internal components of the projector are mounted on a chassis 26.

A focusing assembly is provided which includes a focus control cam 27 pivotally connected by a pin 28 to the lens-prism assembly 18. The cam has a cam surface 29 which is frictionally engaged by a focus control shaft 30 which extends upwardly from the projector and may have a knob (not shown) disposed thereon. The focus control shaft is held in place by a focus shaft clamp 31 which is secured to the chassis 36. A spring 32 is coupled between the pin 28 and a pin 33 affixed to the chassis 26. Rotation of the shaft 30 causes pivoting of the cam 27 about the pin 28 and thereby causes the lens-prism assembly 18 to move back and forth as indicated by an arrow 34. This focusing assembly is the subject of copending application Ser. No. 1,184 entitled "Focusing Assembly for Projectors," filed in the name of Guy C. Caraway and assigned to the assignee of the present invention, now U.S. Pat. No. 3,597,064, issued Aug. 3, 1971, the disclosure of which is incorporated herein by reference.

As the film 16 continues its movement it arrives at an optical sound pickup assembly 36 which includes an optical sound pickup transducer 37 which responds to the film density modulations of the sound track and provides an electrical output which is amplified and applied to a loudspeaker (not shown) mounted at the front of the projector. A lamp 38 projects light through a condenser lens and through the optical sound track to the transducer 37. The lamp 38 is retained in position by means of a bracket 39 and wing nut 40. The film is driven through the optical sound pickup assembly 36 by means of a metal capstan 42 which is driven at a constant speed by an electric motor, and a resilient pressure or pinch roller 43. A capstan scraper 44, according to the present invention, is mounted to engage the periphery of the capstan 42 for effecting cleaning of the capstan and film as will be described in more detail subsequently.

Suitable control buttons 46 and 47 are provided for turning on and off the motor and electronic circuitry of the projector. A volume control 48 is mounted beneath a bracket 49, and has a shaft 50 which extends upwardly from the projector for varying the volume of the sound for the projected film. An upper cartridge guide plate 51 is secured to the chassis 26 and serves as an upper guide for insertion of the cartridge 13. The body of the chassis serves as the lower guide for the cartridge.

Figure 2:
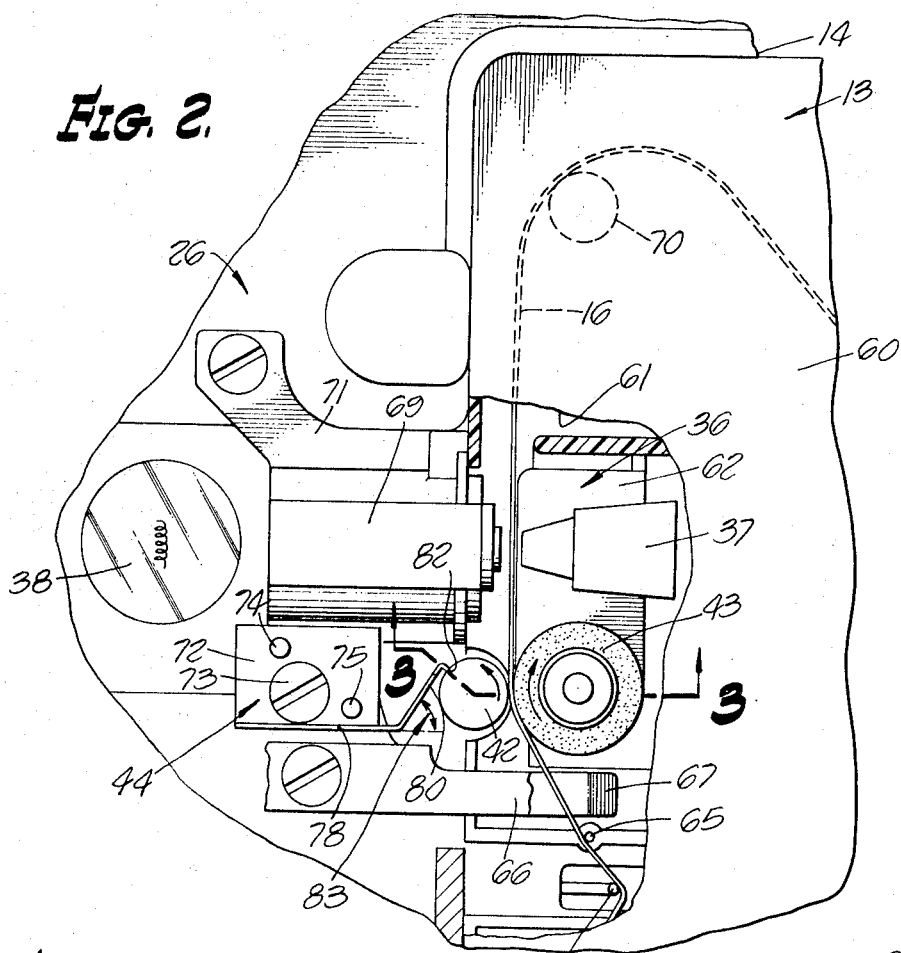
FIG. 2 is an enlarged fragmentary plan view illustrating the capstan scraper of the present invention.
Figure 3:
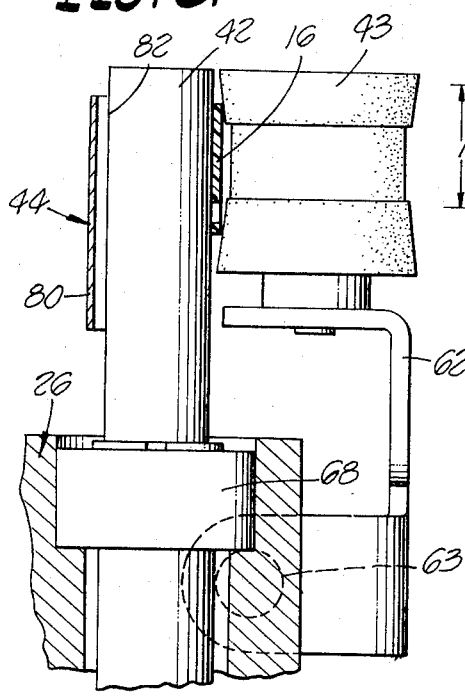
FIG. 3 is a partial elevational view of the assembly shown in FIG. 2.
Figure 4:
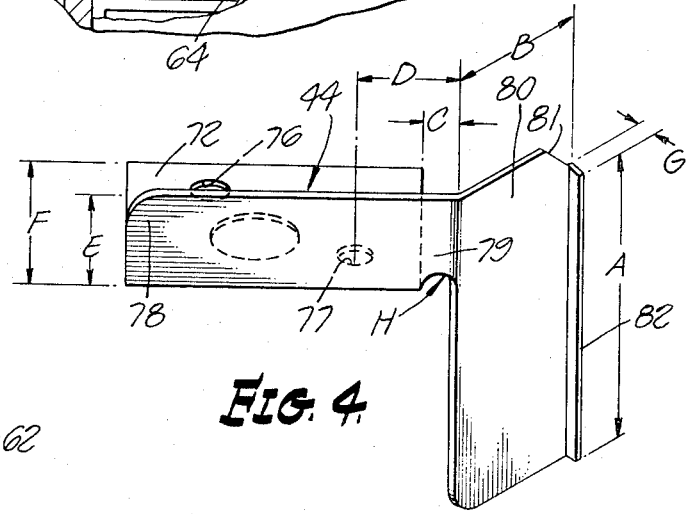
FIG. 4 is a perspective view of the capstan scraper of the present invention.

Turning now to a more detailed discussion of the scraper assembly of the present invention, the same is more completely illustrated in FIGS. 2 through 4. In FIG. 2, the housing 60 of the cartridge 13 is cut away at 61 so that the optical sound pickup assembly can be seen. The optical sound assembly 36 includes a bracket 62, hinged at 63 as seen in FIG. 3, upon which the optical sound transducer 37 and pinch roller 43 are mounted. This assembly is hingeably mounted with the chassis 26 and normally rests down within a cavity in the chassis. However, insertion of the cartridge 13 into the projector 10 causes the assembly 36 to pivot upwardly to the position illustrated in FIGS. 2 and 3 whereby density modulations of the optical sound track may be picked up by the transducer 37. The hinge arrangement also biases the roller 43 against the film 16 and, thus, the film against the capstan.

The film 16, after passing through the film gate 17 illustrated in FIG. 1, moves past a spring biased film loop rod 64 mounted within the projector and then past a film guide pin 65 affixed within the cartridge 13. The film 16 then moves between a pair of film guide fingers 66 and 67, which are secured to the chassis 26 and which serve to properly position the film for travel past the optical pickup 36. That is, the film guide fingers 66 and 67 engage the upper and lower edges of the film 16 to properly orient the film in a horizontal plane such that the optical sound track is properly aligned with the pickup transducer 37.

The film 16 then moves between the capstan 42 and the pinch roller 43. The capstan 42 is mounted in a bearing 68 in the chassis 26 and is driven at a constant speed by an electric motor (not shown). The capstan is grounded to the chassis through the bearing. The film then moves past the optical sound pickup assembly 36. This pickup includes the lamp 38 and a condenser lens assembly 69 which concentrates light from the lamp 38 and applies it through the optical sound track on the film to the transducer 37. The transducer 37 converts the optical density modulations of the sound track to electrical signals which in turn are amplified and applied to a loudspeaker. The film then moves around a roller 70 mounted in the cartridge and back to the roll of film within the cartridge. A bracket 71 serves to support the condenser lens assembly 68 on the chassis 26.

Turning now to the capstan scraper 44, the same includes a base 72 which is secured to the top of the bracket 71 by means of a screw 73. Protrusions 74 and 75 may be molded in the surface of the bracket 71 and extend upwardly to engage respective apertures 76 and 77 in the base 72 of the scraper 44 for maintaining the scraper in a proper position. The scraper 44, bracket 71 and chassis 26 are metal, and the bracket is mounted on the chassis. This arrangement grounds the scraper to the chassis.

A flange 78 extends upwardly from the base 72 of the scraper. Extending from the flange 78 is a connecting portion 79 terminating in a skirt 80 bent at an angle with respect to the flange 78. The skirt 80 is beveled at 81 and terminates in an elongated edge 82 which bears against the periphery of the capstan 42 at an imaginary radial line through the capstan as best seen in FIGS. 2 and 3. The full length of the edge 82 bears against the periphery of the capstan, and it is preferable that the edge 82 be long enough to contact a substantial portion of the length of the capstan, at least a portion longer than the width of the film.

The scraper 44 is made of spring material, such as grade A spring phosphor bronze, and preferably has a thickness of approximately 0.010 inch. The scraper can be stamped from a single piece of metal and then bent to the form shown in the drawings. The angle of the skirt 80 with respect to the flange 78, identified by reference numeral 83 in FIG. 2, preferably is approximately 47°. The edge 82 is at an angle of 90° with respect to the skirt 80. As an example of a specific scraper construction, the dimensions identified by capital letters in FIG. 4 may be as follows: (in inches): A-0.63; B-0.24; C-0.078; D-0.10; E-0.19; F-0.365; G-0.037; and radius, H-1/32. The bevel 81 may be a 45° bevel.

Figure 5:
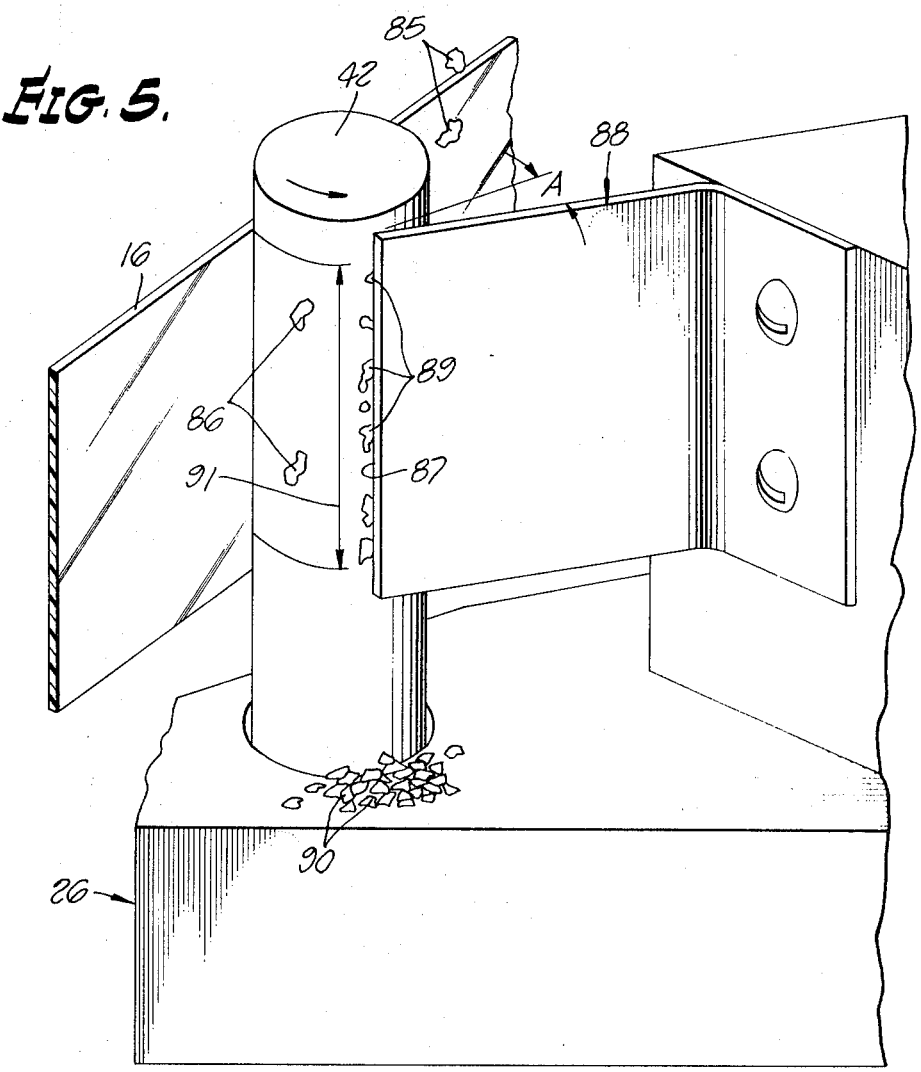
FIG. 5 is a diagrammatic view illustrating the concepts of the present invention.

Turning for the moment to FIG. 5, the same is a simplified diagram of the capstan scraper assembly. It will be observed that the film 16, or other suitable tape or strip, is moving in the direction of rotation of the capstan 42, with loose particles 85 statically charged and adhering to the film. As the particles reach the capstan they are attracted to the capstan and rotate on its surface as indicated at 86. The particles can travel no further when the tip 87 of the spring loaded wiper or scraper 88 is reached, as indicated at 89. Thus, the surface of the capstan passing by the tip 87 recontacts the film in a cleaned condition. The particles 89, as has been repeatedly observed, remain on the wiper until they are neutralized, and then they drop off to the area below the wiper as indicated at 90. The scraper 88 is mounted at an angle A so as to provide a tip or edge contact instead of tangential contact. The line 91 indicates the film contact area of the capstan.

In most film applications involved during evaluation of the present concepts there appears to have been sufficient normal static charge buildup to achieve the above-described cleaning action. However, as will be apparent to those skilled in the art the static charge can be manipulated or controlled, as by providing suitable materials for imparting or reducing the charge on the film or capstan in certain applications to accomplish the desired cleaning.

It should further be noted that most films, tapes, or strips commonly contain on their surfaces lubricants, waxes or tacky particles which would be desirable to be removed and isolated once they are deposited on the surface of the roller or shaft. Since these particles do intermittantly come off and on, as well evidenced by those practically versed and experienced in the field of film handling, the present concepts are useful in accomplishing this task.

It will be apparent to those skilled in the art that the capstan scraper 44, by the edge 82 thereof, serves to clean the capstan. Additionally, however, there is a further and unexpected result in that the film 16 is in turn cleaned by the capstan when the scraper is used. This is an observed result, although the precise reason therefor is not fully understood. It is believed, as noted earlier, that there is an electrostatic and cleaning action formed by the capstan in combination with the film through the action of the capstan scraper and capstan.

The present embodiment of this invention is to be considered in all respects as illustrative and not restrictive.

I claim:

1. A capstan scraper for use with the capstan of a motion picture projector wherein the capstan drives motion picture film through said projector, comprising
a unitary member formed of spring metal comprising a base adapted to be affixed to a projector,
a flange extending at substantially a right angle from said base,
an elongated skirt depending from said flange and being arranged at an angle with respect to said flange, and
an edge depending from said skirt at substantially a right angle thereto, said edge being adapted to bear against the periphery of the capstan of a projector along a substantially continuous line so as to wipe across an area of the surface of said capstan of a width at least substantially equal to the width of the film; and
said skirt being substantially radially disposed relative to said capstan.

2. A scraper as in claim 1 wherein
said member is formed of relatively thin bronze material.

3. A web cleaning assembly for cleaning a web having stored therein information, said web being driven through utilization apparatus for deriving said information from said web, said apparatus having a roller for driving said web therethrough, comprising
support means within said apparatus for rotatably supporting said roller, and
scraper means for engaging the periphery of said roller, said scraper means including a spring metal member having a first portion affixed to said support member and a second portion depending from said first portion, said second portion having an edge bearing against the periphery of said roller along a substantially continuous line so as to wipe across an area of the surface of said roller of a width at least substantially equal to the width of the web; and said second portion being substantially radially disposed relative to said roller.

4. An assembly as in claim 3 including means for pinching said web against the periphery of said roller for enabling said roller to drive said web through said apparatus, and said edge bears against said roller along a radial line through said roller and at least along the portion of the length of said roller which engages said web.

5. A method of cleaning motion picture film as said film is moved by a capstan through motion picture apparatus, comprising the steps of driving said film through said apparatus with a metal capstan and a resilient pinch roller, and resiliently bearing a metal scraper edge against the periphery of said capstan along a substantially continuous line so as to wipe across an area of the surface of said capstan of a width at least substantially equal to the width of the film and disposing said edge substantially radially relative to said capstan.

* * * * *